United States Patent
Sang et al.

(10) Patent No.: US 6,563,818 B1
(45) Date of Patent: May 13, 2003

(54) WEIGHTED ROUND ROBIN CELL ARCHITECTURE

(75) Inventors: Jinqlih Sang, Fremont, CA (US); Edward Yang, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/314,976

(22) Filed: May 20, 1999

(51) Int. Cl.[7] .............................................. H04L 12/50
(52) U.S. Cl. .................. 370/379; 370/382; 370/395.41; 370/461; 370/462; 370/401; 711/151; 711/158; 379/229
(58) Field of Search ................................ 711/151, 158; 370/401, 379, 412–420, 230–231, 402, 404, 422–425, 445, 382, 395.41, 461–462; 379/229

(56) References Cited

U.S. PATENT DOCUMENTS

| | | | |
|---|---|---|---|
| 4,630,258 A | * | 12/1986 | McMillen et al. .......... 370/411 |
| 5,515,376 A | | 5/1996 | Murthy et al. |
| 5,754,540 A | * | 5/1998 | Liu et al. ..................... 370/279 |
| 5,768,211 A | * | 6/1998 | Jones et al. ............. 365/189.04 |
| 5,923,656 A | * | 7/1999 | Duan et al. ............... 370/395.4 |
| 6,035,360 A | * | 3/2000 | Doidge et al. .............. 709/249 |
| 6,173,425 B1 | * | 1/2001 | Knaack et al. .............. 714/718 |
| 6,223,305 B1 | * | 4/2001 | Simmons et al. ............. 714/34 |
| 6,310,876 B1 | * | 10/2001 | Egbert ......................... 370/389 |
| 6,327,246 B1 | * | 12/2001 | Jones .......................... 370/232 |
| 6,336,156 B1 | * | 1/2002 | Chiang ......................... 710/10 |
| 6,345,371 B1 | * | 2/2002 | Lam ............................ 714/719 |
| 6,356,551 B1 | * | 3/2002 | Egbert ......................... 370/389 |

* cited by examiner

Primary Examiner—Douglas Olms
Assistant Examiner—Van Kim T. Nguyen

(57) ABSTRACT

A network switch configured for switching data frames across multiple ports utilizes an efficient arbiter to store the data frames. Each port possesses queuing logic for requesting a free pointer from a free buffer queue. A multi-level arbitration logic arbitrates all the requests of equal priority from the network switch ports in a round robin scheme. The arbitration logic comprises a plurality of cells that cascaded to output an acknowledgement signal in response to an inhibit signal and a request signal as well as a counter that is incremented upon an asserted acknowledgement signal.

15 Claims, 11 Drawing Sheets

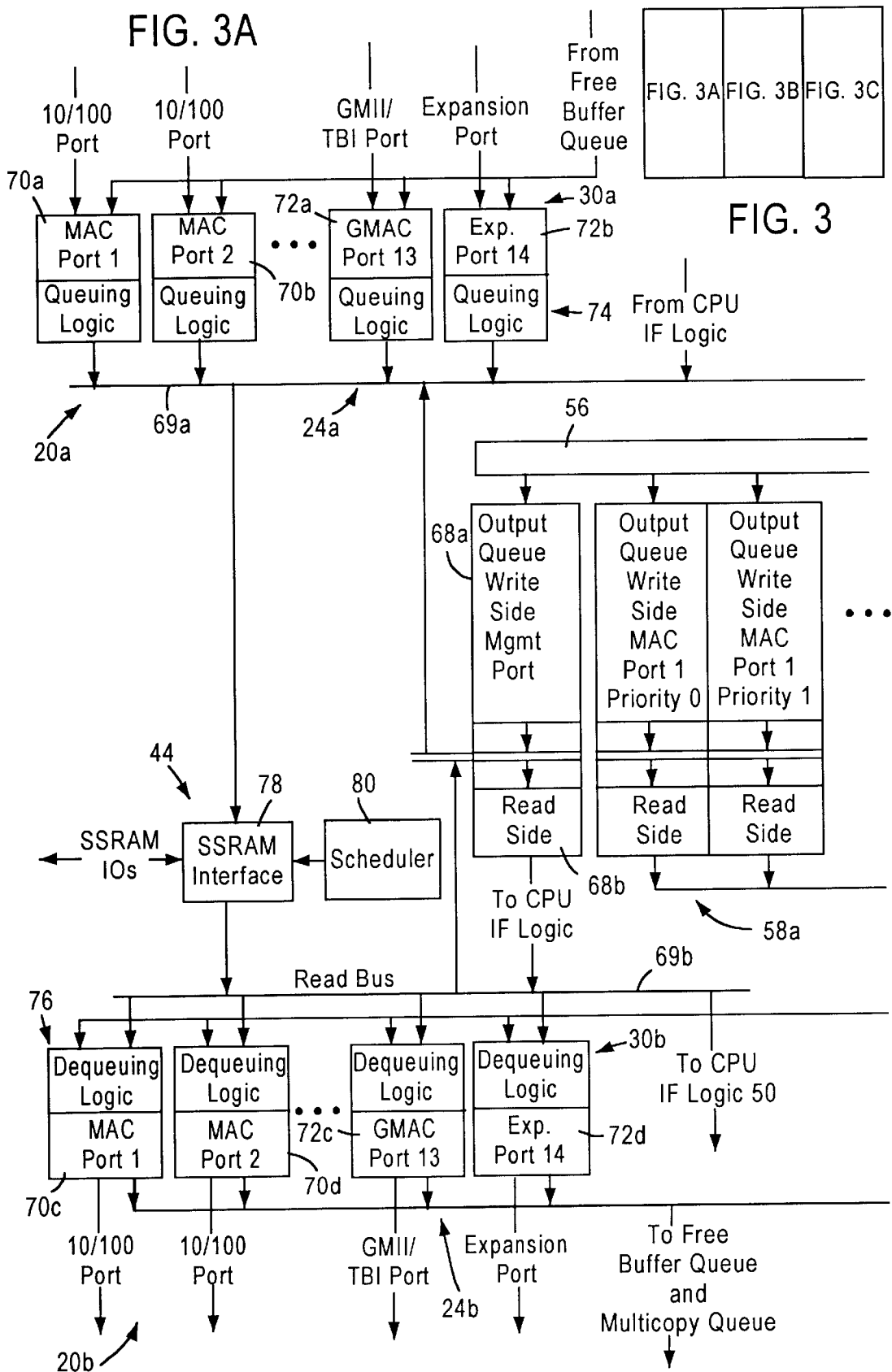

WEIGHTED ROUND ROBIN CELL ARCHITECTURE

BACKGROUND OF THE INVENTION

1. Technical Field

The present invention relates to data communication networking devices, more particularly, to an arbitration logic architecture used in storing data frames in memory.

2. Background Art

In computer networks, a plurality of network stations are interconnected via a communications medium. For example, Ethernet is a commonly used local area network scheme in which multiple stations are connected to a single shared serial data path. These stations often communicate with a switch located between the shared data path and the stations connected to that path Typically, the switch controls the communication of data packets on the network.

When all of the stations connected to the network are simultaneously operating, packet traffic on the shared serial path can be heavy. In order for the data to be properly transmitted, the switch must manage the storage of these data packets within memory. Typically, a free buffer queue stores free address pointers; these free pointers point to available address space in memory where data can be stored. In a complex system such as a multiport switch, the free buffer queue provides a mechanism to orderly manage the requests for free pointers by various logic within the switch. An arbitration logic utilizes a round robin algorithm to honor the requests that are of identical priority. One approach to providing this type of arbitration scheme is discussed below with respect to Tables 1 and 2.

For the purposes of explanation, it is assumed that a multiport switch has six ports for the receipt and transmission of data frames. These six ports have equal priority. Each port has queuing logic tat executes requests to the free buffer queue for a free pointer upon receipt of a data frame. As indicated previously, a free pointer points to available space within memory for storage of the received data frame. The data frame is stored in the memory until the switch makes the appropriate switching decisions for that data frame, and is thereafter transmitted. To monitor and track which port should be granted the request, the arbitration logic, typically, has to maintain the following information (shown below):

TABLE 1

| Counter Value | REQ 1 | REQ 2 | REQ 3 | REQ 4 | REQ 5 | REQ 6 |
|---|---|---|---|---|---|---|
| 01 | 1 | X | X | X | X | X |
| 02 | 1 | 0 | 0 | 0 | 0 | 0 |
| 03 | 1 | X | 0 | 0 | 0 | 0 |
| 04 | 1 | X | X | 0 | 0 | 0 |
| 05 | 1 | X | X | X | 0 | 0 |
| 06 | 1 | X | X | X | X | 0 |

The first column, labeled Counter Value, represents the values of a counter that is maintained by the arbitration logic. This counter value is also referred to as the slot number. The counter in this case is a 3-bit counter, which is incremented whenever an acknowledgement is sent by the arbitration logic to the respective port. As an illustration, Table 1 represents the conditions in which the arbitration logic may grant an acknowledgement to request 1 (REQ_1) from port 1. If the counter value is 1, for example, REQ_1 is 1 and the request bits that correspond to the remaining ports 2–6 are in a "DON'T CARE" state (denoted by "X"). The second condition, in which REQ_1 is honored, is when the counter value is 2 and all the other requests are 0. If the counter value equals 3, REQ_1 is 1 while REQ_2 is in a "DON'T CARE" state and the remaining requests bits are 0. REQ_2 is in a "DON'T CARE" state because the arbitration logic checks the request sequentially and then loops back; thus, the acknowledgement would be sent out based upon REQ_1 being set to 1, which precedes REQ_2. The other conditions (i.e., when the counter equals 4, 5, and 6) follow the same rationale.

This scheme provides port 1 the absolute right to be granted an acknowledgement when the counter value is 1, assuming port 1 has a request. However, port 1 will only be granted an acknowledgement when the counter value is 2 if each of the other ports does not have a request. When the counter value is 3, port 1 will be granted and acknowledgement if it has a request and ports 3–6 do not. In this case, port 1 has priority over port 2 so that a request by port 2 does not matter in making the decision to grant an acknowledgement to port 1. It is apparent that for the arbitration logic to issue an acknowledgement, all the conditions of Table 1 have to be captured for only a single acknowledgement. Table 2 illustrates the conditions that must be satisfied to instruct the arbitration logic to issue an acknowledgement to REQ_2 from port 2. The conditions for granting the remaining requests (i.e., REQ_3, REQ_4, REQ_5, and REQ_6) exhibit a similar scheme.

TABLE 2

| Counter Value | REQ 1 | REQ 2 | REQ 3 | REQ 4 | REQ 5 | REQ 6 |
|---|---|---|---|---|---|---|
| 01 | 0 | 1 | X | X | X | X |
| 02 | X | 1 | X | X | X | X |
| 03 | 0 | 1 | 0 | 0 | 0 | 0 |
| 04 | 0 | 1 | X | 0 | 0 | 0 |
| 05 | 0 | 1 | X | X | 0 | 0 |
| 06 | 0 | 1 | X | X | X | 0 |

Because of the numerous permutations that must be processed with respect to each acknowledgement, the conventional arbitration logic is complex. That is, the number of gates (or gate counts) increases with logic complexity, resulting in suboptimal performance and increased die size.

SUMMARY OF THE INVENTION

There exists a need for a implementing a more efficient round-robin arbitration architecture. There is also a need for reducing complexity of the arbitration logic. There is yet another need to minimize the die size of the device.

These and other needs are met by the present invention, where an arbitration logic grants acknowledgements to a requesting port in a round robin scheme. The architecture of the arbitration logic comprises multiple cells that are cascaded. The cascaded cells output an acknowledgement signal in response to an inhibit signal and a request signal. A counter maintains the order of the round robin scheme and is incremented only when the arbitration logic grants an acknowledgement According to one aspect of the invention, a multiport switch is configured for controlling communication of data frames. The multiport switch comprises a buffer queue, which stores free buffer pointers. The free buffer pointers point to addresses of available memory space within the memory. A plurality of ports receive and transmit the data frames. Each of the ports is configured to output a request signal to request one of the free buffer pointers from the buffer queue. An arbitration logic receives and arbitrates the request signals from the plurality of ports according to a round robin scheme. The arbitration logic comprises a plurality of cells that correspond to the plurality of ports. These cells are cascaded in a prescribed sequence. The cell with the highest priority is able to send an acknowledgement signal to a corresponding requesting port, assuming the cell has received a request signal from that port. This highest priority cell concurrently sends an inhibit signal to the other lower priority cells to prevent each of these cells from sending another acknowledgement signal. The priorities of the cells are based in part on the relative positions of the cells within the prescribed sequence. This arrangement reduces complexity of the arbitration logic.

Another aspect of the present invention provides a method for storing data frames in memory. The method includes outputting a plurality of request signals to request a free buffer pointer. A free buffer pointer indicates an address of available space within the memory. The plurality of request signals are synchronized. The method also includes arbitrating the request signals in a round robin scheme by utilizing a plurality of cells cascaded in a prescribed sequence. The step of arbitrating comprises selecting a cell based upon a counter value, and outputting an inhibit signal from the selected cell in response to a corresponding request signal. The inhibit signal inhibits the other cells in the prescribed sequence from asserting their respective acknowledgement signals. The step of arbitrating further includes selectively asserting by the selected cell a corresponding acknowledgement signal based upon the corresponding request signal and a received inhibit signal, incrementing the counter value in response to the asserted acknowledgement signal, and obtaining the free buffer pointer in response to the asserted acknowledgement signal. Under this arrangement, arbitration of the request signals is efficiently performed.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

FIG. 6b is a flow diagram illustrating the operations of the block diagram of FIG. 6a.

DETAILED DESCRIPTION OF ILLUSTRATIVE EMBODIMENTS

The present invention will be described with the example of a switch operating in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
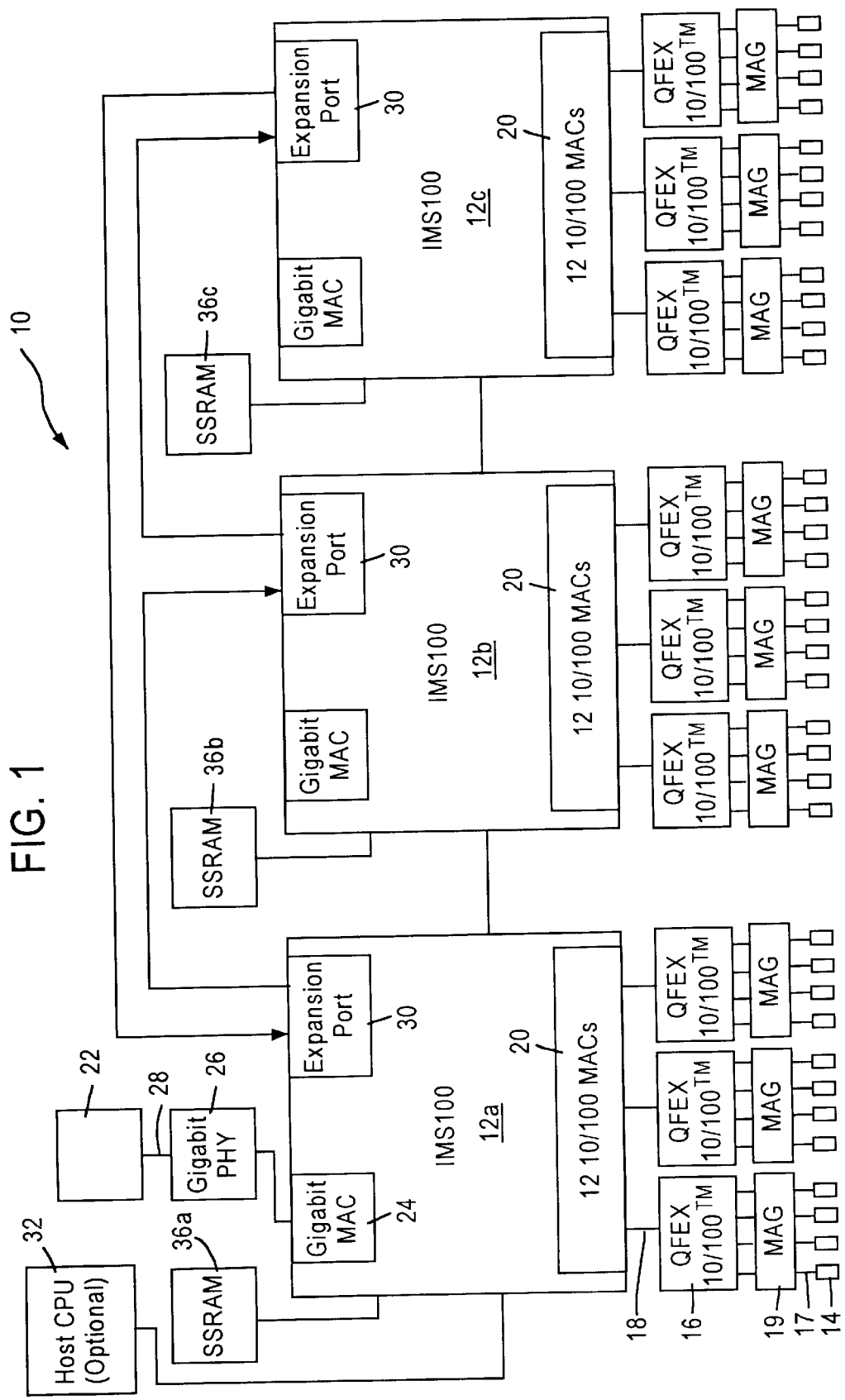
FIG. 1 is a block diagram of a packet switched network including a multiple port switch.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding shared media independent interface (MII) 18. In particular, each 10/100 PHY transceiver 16 is configured for sending and receiving data packets between the multiport switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. For example, each expansion port 30 can be implemented as a second gigabit MAC port similar to port 24, thereby enabling multiple multiport switches 12 to be cascaded together as a separate backbone network.

Figure 2:
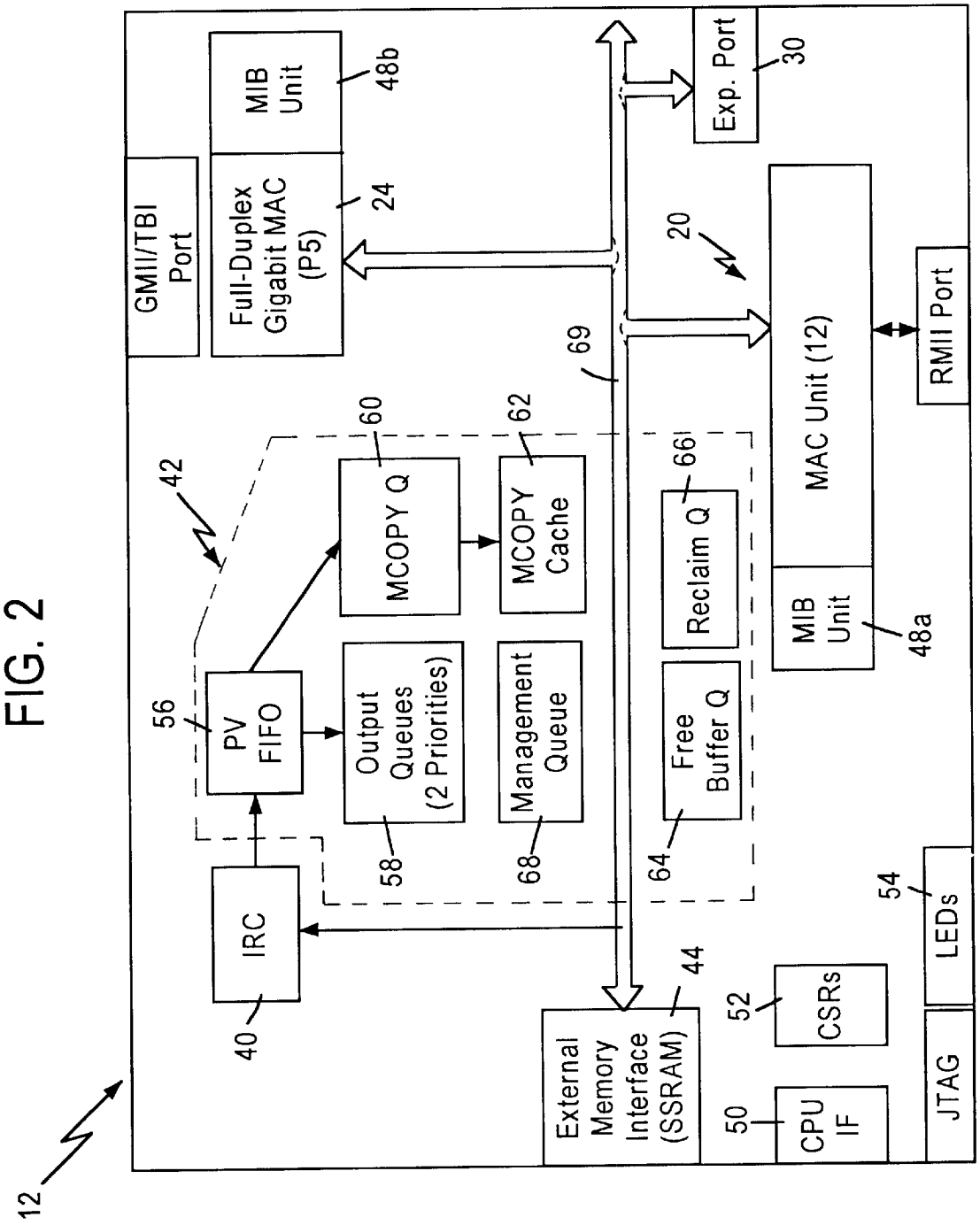
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data, memory structures, and MIB counter information. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, or all ports (i.e., broadcast). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should receive the data frame, Rx port number, an untagged set field, VLAN information, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 fetch the data flame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are fetched from the respective output queues 58, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that can be reclaimed by the free buffer queue 64 as free pointers. After being returned to the free buffer queue 64, the frame pointer is available for reuse by the MAC unit 20 or the gigabit MAC unit 24.

Figure 3B:
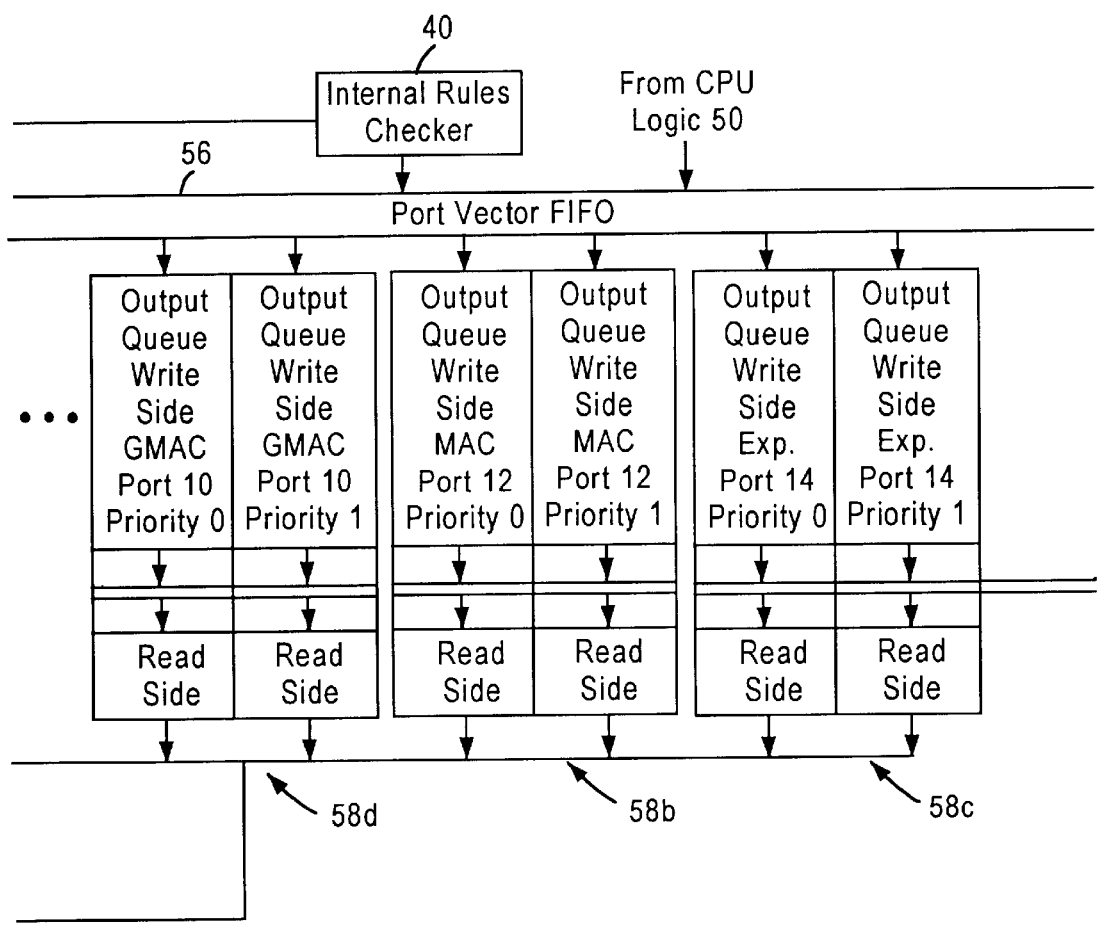
FIG. 3 is a block diagram illustrating in detail the switching subsystem of FIG. 2.
Figure 3C:
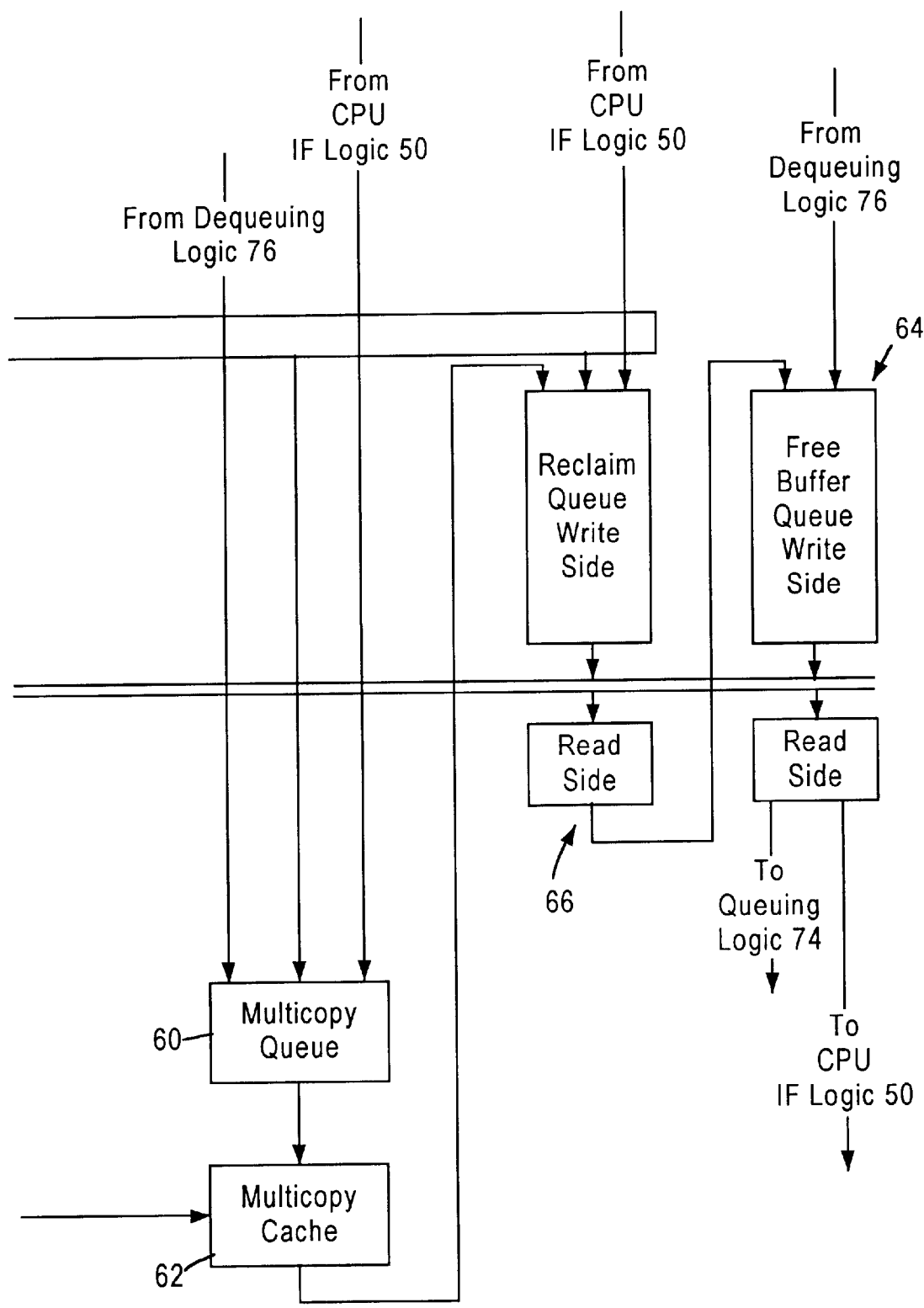

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot based on the retrieved frame pointer. The frame data is stored in the location pointed to by the free buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided.

Arbitration Logic Architecture

The present invention is directed to an arbitration logic that receives and arbitrates the request signals from a number of ports 70a according to an round robin scheme. The architecture of the arbitration logic, in one embodiment, includes multiple cells that are cascaded in a prescribed sequence. In this embodiment, the prescribed sequence is in the form of a loop. Collectively the cascaded cells output an acknowledgement signal to the particular queuing logic that issues the request in response to a request signal and an inhibit signal from a preceding cell. In effect, the arbitration logic permits the requesting port 70a to obtain a free buffer pointer from the free buffer queue. Specifically, the queuing logic 74, in one exemplary embodiment, within the ports 70a supply the logic to issue the requests.

Figure 4:
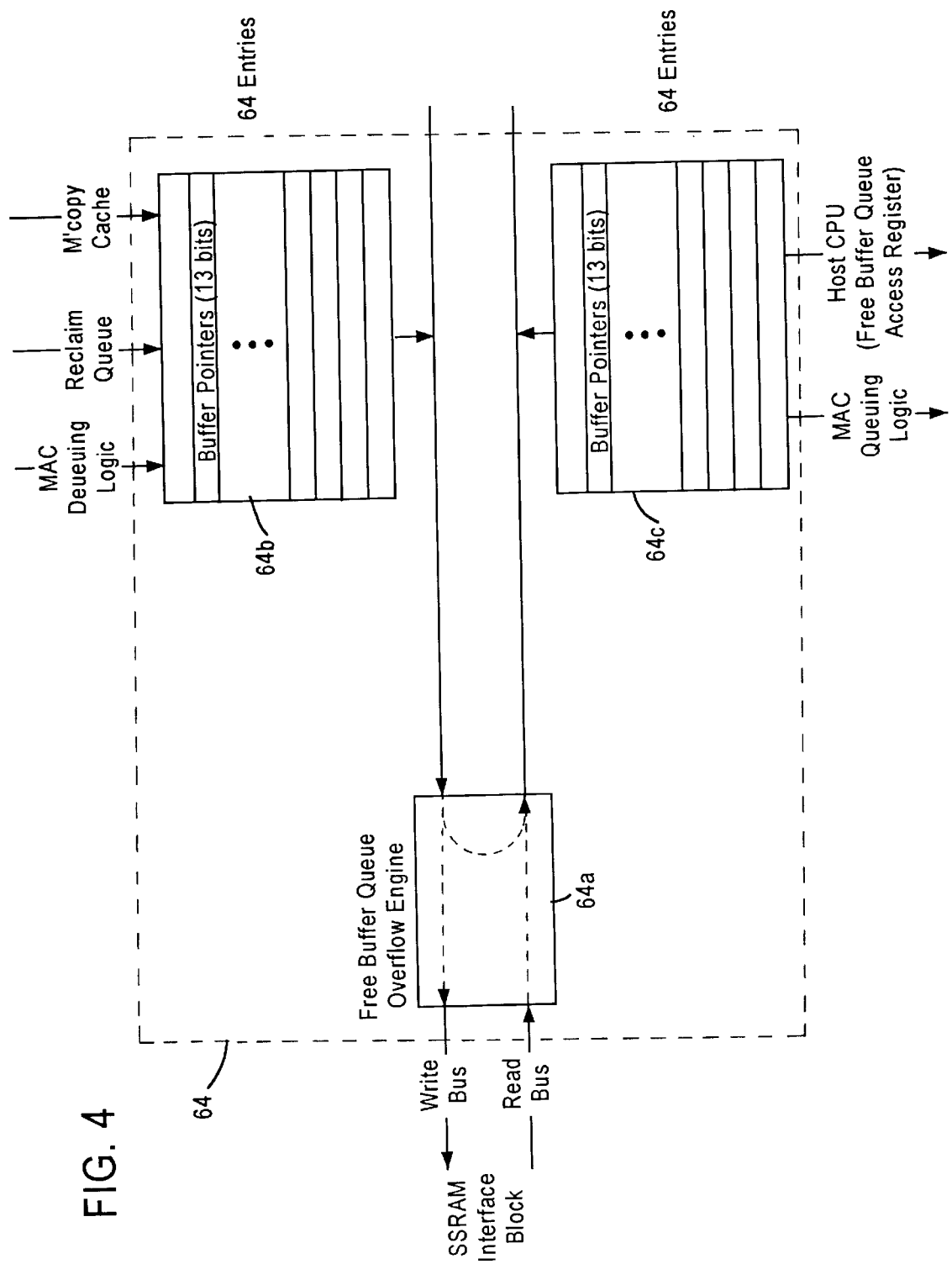
FIG. 4 is a block diagram of a free buffer queue of FIG. 2.

FIG. 4 shows the structure of the free buffer queue 64. The free buffer queue 64 contains address pointers to free buffers in the global frame buffer pool in external memory (SSRAM) 36a. As shown in the figure, the free buffer queue 64 is structured with a write side queue 64b, a read side queue 64c, and an overflow engine 64a. The write side queue 64b and the read side queue 64c are built into the multiport switch 12. An overflow area (not shown) is maintained by the overflow engine 64a in the external memory 36a. The queues 64b and 64c hold 64 entries each. The MAC dequeuing logic 76 and the reclaim logic of the reclaim queue 66 write buffer pointers into the write side of the queue 64b. The MAC queuing logic 74 and the host CPU 32 read buffer pointers from the read side 64c. When the read side queue 64 overflows, the entries are stored in the overflow area in external memory 36a by the overflow engine 64a. There is no restriction in maintaining any ordering of the buffer pointers in the free buffer queue 64, and therefore, the write side queue 64b may place entries directly into available entries in the read side queue 64c without maintaining order with respect to entries in the overflow area.

When the IRC 40 completes forwarding of a frame, the frame pointers are returned to the write side 64b of the free buffer queue 64, either directly by the MAC dequeuing logic 76, or by the reclaim process. Buffer pointers returned to the buffer queue 64 pass from the write queue 64b to the read side queue 64c. If the read side queue 64c becomes full, the free buffer queue overflow area is used for additional buffer pointers. Once the read side queue 64c and the free buffer queue overflow area are full additional buffer pointers placed into the free buffer queue 64 will begin to fill the write side queue 64b of the queue 64 again. If an attempt is made to write another buffer pointer to the free buffer queue 64, while the read side queue 64c and the write side 64b are both full, the queue 64 will overflow and the free buffer queue issues the necessary interrupt signals.

Figure 5:
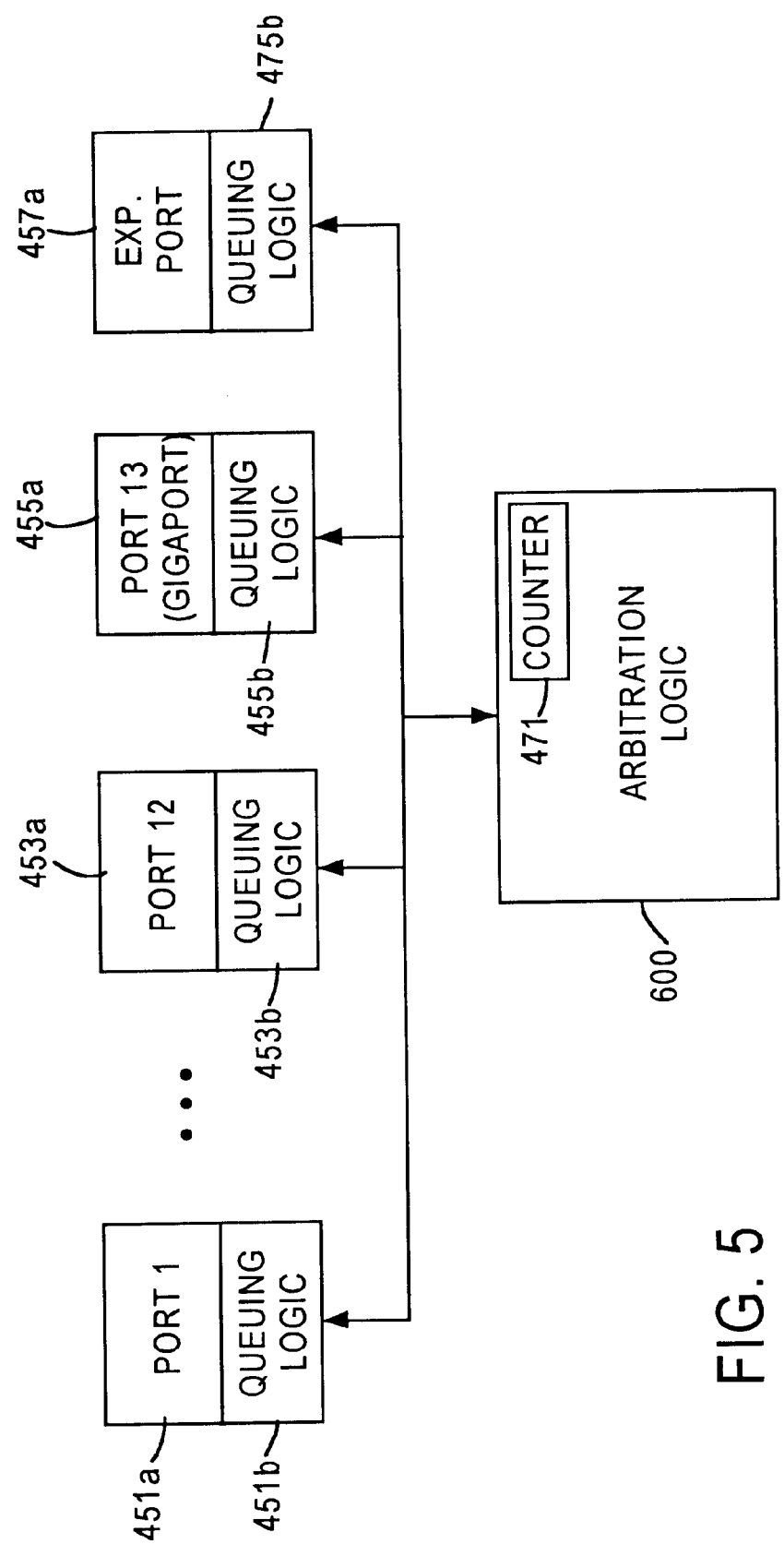
FIG. 5 is a block diagram illustrating the arbitration logic in accord with an embodiment of the present invention.

FIG. 5 is a block diagram that shows the relationship between the arbitration logic 600 and multiple ports within the multiport switch 12. In this exemplary embodiment, port 1 (reference numeral 451a) through port 12 (reference numeral 453a) have equal priorities. However, the gigaport, port 13, 455a has a higher priority than ports 1 through 12. The expansion port 457a has the same priority as the gigaport 455a. Each of ports 1–12 has an associated queuing logic; port 1 451a has queuing logic 451b and port 12 453a has queuing logic 453b. Similarly port 13 455a has queuing logic 455b. Expansion port 457a has queuing logic 457b. When either one of these ports desires a free buffer pointer from the free buffer queue 64, it issues a request signal. The present invention deals with the case in which multiple requests are simultaneously issued from ports of equal priority. As seen from FIG. 5, arbitration logic 600, in an exemplary embodiment, has a counter 471, which assists the arbitration logic 600 in effecting a round robin scheme to access the memory 36a.

Figure 6A:
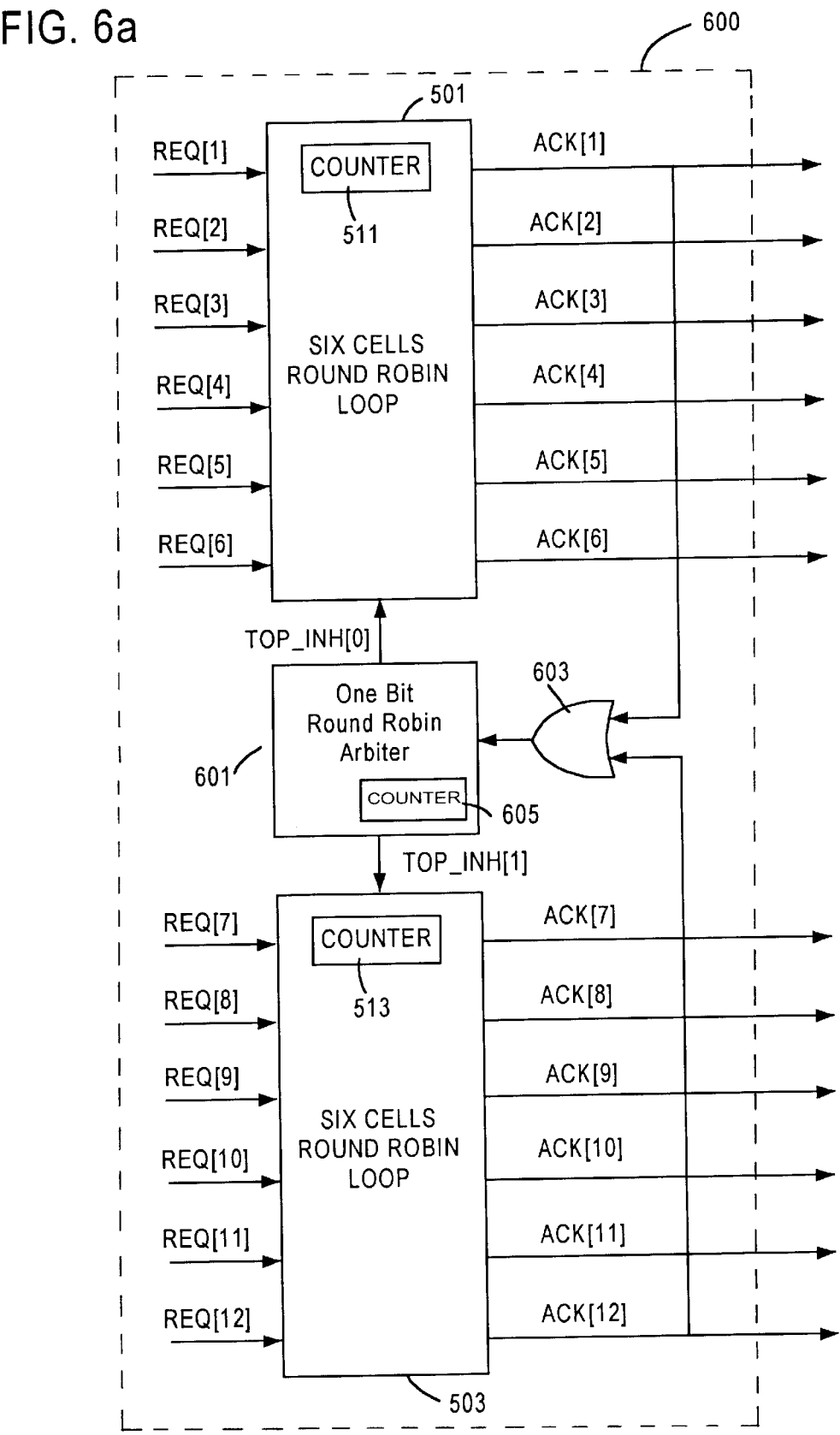
FIG. 6a is a block diagram of the arbitration logic of FIG. 5 in accordance with an embodiment of the present invention.

FIG. 6a illustrates a preferred embodiment of the architecture of arbitration logic 600. For optimal performance, the arbitration logic utilizes two main arbiters 501, 503 to process the 12 possible requests from ports 1–12 (e.g., 451a, 453a). Each arbiter 501 and 503 handles 6 requests; arbiter 501 serves port 6, while arbiter 503 handles port 7 through port 12. A third arbiter 601 acts to transparently arbitrate among the 12 ports. Within each of the main arbiters 501, 503 are 6 cells cascaded in a loop to implement a round robin scheme. The details of the arbiters operations and architecture are discussed later with respect to FIGS. 6b and 8, respectively. Arbiter 501 outputs acknowledgement signals to the respective ports, ACK[1] through ACK[6], in response to receive request signals, REQ[1] through REQ[6]. A counter 511, in one embodiment, resides within arbiter 501 and serves to maintain the round robin scheme. The counter 511 stores a counter value (or a slot number), which corresponds to a particular port. Although arbiter 501 outputs ACK[1] through ACK[6] signals, only one of these acknowledgement signals can be ON at any given time. That is, the arbiter can only grant one acknowledgement per arbitration session. This constraint is also applicable to arbiter 503. As with arbiter 501, arbiter 503 outputs acknowledgement signals, ACK[7] through ACK[12], in response to request signals from ports 7 through 12 (i.e., REQ[7] through REQ[12]). The one bit round robin arbiter 601 outputs two signals that inhibit either the arbiter 501 or arbiter 503 from granting an acknowledgement: TOP_INH[0] signal (top inhibiting signal), and TOP_INH[1] signal. The two top level inhibiting signals, TOP_INH[0] and TOP_INH[1], are set by the one bit round robin arbiter 601 such that they have opposite values. The arbitration logic 600 includes an OR gate 603 that sums the acknowledgement signals from arbiter 501 and arbiter 503 to the one bit round robin arbiter 601. The one bit round robin arbiter 601 uses a one bit counter 605. This one bit counter 605 increments in response to a high level signal at the output of OR gate 603. In turn, the one bit round robin arbiter 601 outputs the top level inhibiting signals based upon the value of the counter 605. These top level inhibiting signals, TOP_INH[0] and TOP_INH[1], are global inhibiting signals to each of the arbiters 501, 503. For example, if TOP_INH[0] is 1, then TOP_INH[1] is 0, wherein a one setting indicates that an acknowledgement signal should not be asserted by the receiving arbiter. Hence, only one of the arbiters 501 or 503 can assert an acknowledgement at any one time.

Figure 6B:
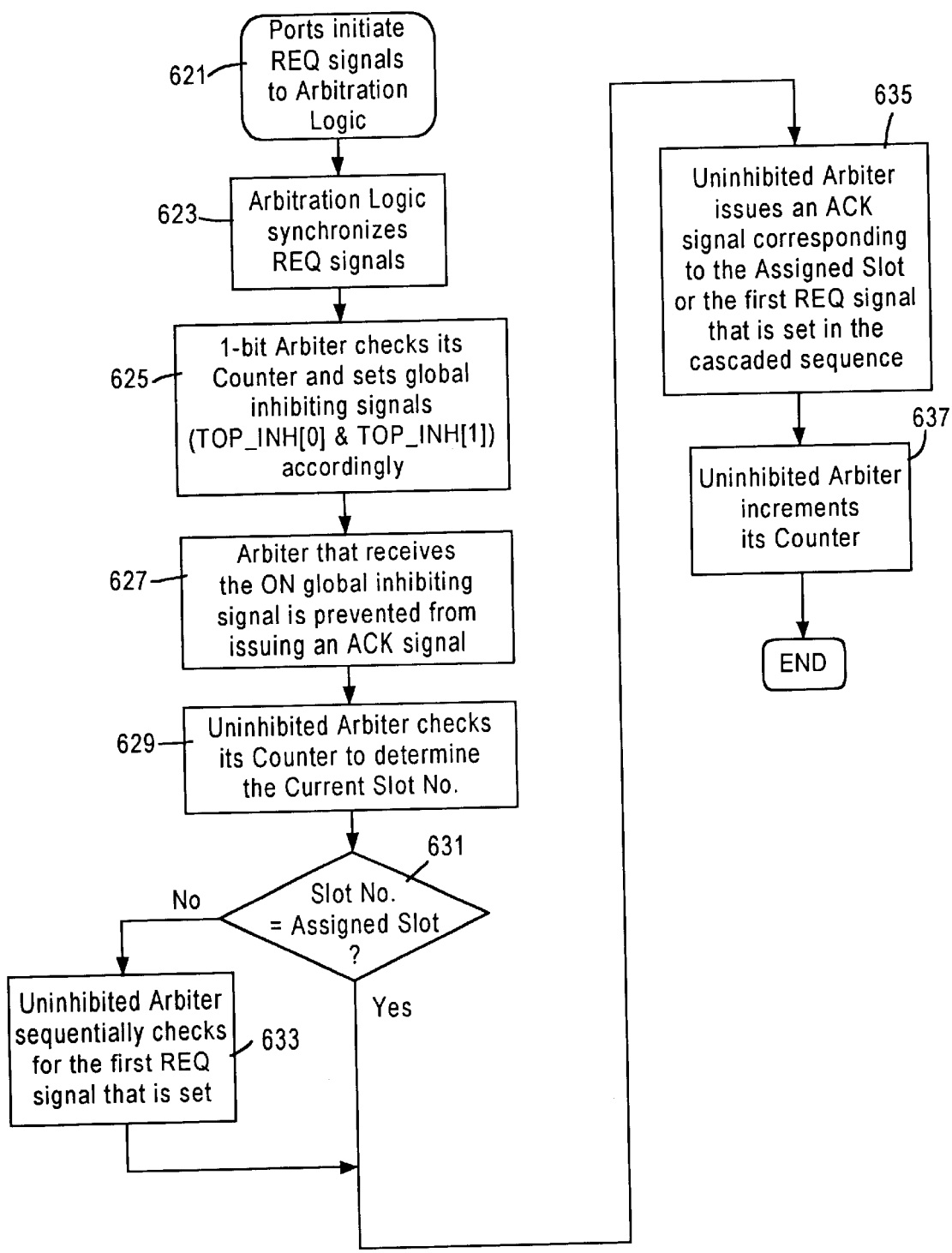

The operations of arbitration logic 600 is shown in FIG. 6b. Initially, the ports 70a in step 621 send request signals to the arbitration logic 600. The arbitration logic then synchronizes the requests in sequential order for processing (step 623) by the arbiters 601, 501, 503. In step 625, the one bit arbiter 601 checks the value of its counter 605 to determine which arbiter 501 or 503 to inhibit from issuing an acknowledgement signal via the TOP_INH[0] and TOP_INH[1] signals. For example, if the counter 605 has a slot number of 0 and assuming arbiter 501 is assigned to 0, arbiter 501 is permitted to grant an acknowledgement signal; accordingly, the one bit arbiter 601 sets the TOP_INH[1] signal to 1 and the TOP_INH[0] signal to 0. The arbiter 503, which receives the HIGH global inhibiting signal (e.g., TOP_INH[1]) cannot issue an acknowledgement signal (step 627). As in step 629, the uninhibited arbiter, which in this example is arbiter 501, checks its counter 511 for the slot number. The arbitration logic 600 next checks whether the determined slot number is equal to the assigned slot (step 631); that is, whether the port that is given priority has sent a request. The term "assigned slot" refers to the resultant mapping of ports to cells; e.g., if port 1 is mapped to cell 1, then port 1 has an assigned slot of 1. If the slot number is not equal to the assigned slot, the uninhibited arbiter 501 sequentially checks for a HIGH request signal among the other cells in the cascaded sequence, per step 633. Next, in step 635, arbiter 501 issues an acknowledgement signal corresponding to the assigned slot if the slot number equals the assigned slot or corresponding to the first HIGH request signal. After issuing the acknowledgement signal, arbiter 501 increments counter 511 as in step 637. Once an acknowledgement signal has been granted, the above process repeats with the one bit arbiter 601 examining its counter 605 to determine which arbiter 501 or 503 is permitted to grant another acknowledgement signal.

For the purposes of explanation with an example, assume that port 2, port 3, and port 5 issue a request for a free buffer pointer from free buffer queue 64. Therefore, the request signals, REQ[2], REQ[3], and REQ[5] are all ON while the remaining request signals are OFF. Also, assume the slot number in counter 511 is equal to 3, and the counter 605 of the one bit round robin arbiter 601 has a value of zero. When these request signals, REQ[2], REQ[3], and REQ[5], are received by the arbitration logic 600, the one bit round robin arbiter 601 examines the slot number in counter 605. The one bit round robin arbiter 601 sets the TOP_INH[0] signal to 1 based on the counter value of 0; this indicates that the arbiter 501 is permitted to grant an acknowledgement The one bit round robin arbiter 601 accordingly sets the TOP_INH[1] signal to 0, such that the arbiter 503 is not permitted to send an acknowledgement signal. Once the arbiter 501 has been granted permission to issue an acknowledgement signal, arbiter 501 proceeds to examine counter 511 to determine the current slot number, which is 3 in this example. This assumes that the TOP_INH[0] signal is again set to 1, so that the arbiter 501 is again permitted to send an acknowledgement signal. Because REQ[3] is set to 1 and the counter value is 3, the arbiter 501 asserts the acknowledgement signal ACK[3]. The counter 511 increments to 4 in response to the asserted acknowledgement ACK[3] signal. The arbiter 501 now the request signal from port 4 (i.e., REQ[4]) and notes that this signal is set to 0, and thus, proceeds to check the next request signal, REQ[5]. Because REQ[5] is set to one, arbiter 501 asserts ACK[5], thereby causing counter 511 to increment to 5. In essence, port 4 has relinquished its "token" to the next port; that is, priority is given to the next port in the cascaded sequence that has sent a request. The counter 511 maintains the value of 5 until subsequent requests from ports 1 through 6 receive acknowledgements.

Assume next that after the issuance of requests from ports 2, 3, and 5, ports 7 and 9 request a free buffer pointer from free buffer pointer queue 64. When the requests from port 7 and port 9 corresponding to REQ7 and REQ9, respectively, are received by the arbitration logic 600, the one bit round robin arbiter 601 again checks its counter 605 to determine the slot number. The counter 605 now has a value of 1 because an acknowledgement signal was issued by arbiter 501. The one bit round robin arbiter 601 in turn sets the TOP_INH[1] to a value of 1. Accordingly, arbiter 503 is now permitted to issue an acknowledgement signal. The TOP_INH[0] signal is set to zero by the one bit round robin arbiter 601 to indicate to arbiter 501 not to assert an acknowledgement signal. The arbiter 503 checks its counter 513 to determine the slot number, which in this case is assumed to be 7. Because the REQ[7] signal is ON and the slot number is 7, the arbiter 503 asserts the ACK[7] signal, notifying port 7 that it is permitted to obtain the free buffer pointer. Counter 513, in response to the assertion of the acknowledgement, increments to a slot number of 8. At this point arbiter 503 may grant an acknowledgement to port 8 if the REQ[8] signal is ON; however, the REQ[8] signal is OFF, causing arbiter 503 to examine the next assigned slot's request signal, namely REQ[9]. Basically, the arbiter sequentially checks subsequent assigned slots request signals along the cascaded sequence until a request that has been set is found, which in this instance is REQ[9]. Because the port 9 has sent a request (REQ[9] is set to 1), the arbiter 503 accordingly issues an acknowledgement signal ACK[9] to port 9. Concurrently, arbiter 503 increments the counter 513 by one to slot number 9. Port 9 can thus receive another acknowledgement signal if it has request during this state. This is so because the previous issuance of the acknowledgement signal gave priority to port 8. Essentially, if port 8 has not issued a request, the acknowledgement signal is granted to the other ports in a sequential manner. Such an arrangement advantageously ensures that every port is given priority and that a port with a request but no priority can be granted an acknowledgement signal with minimal processing delay. The above discussion deals with the principle of operation and architecture of the arbitration logic 600, in accord with an embodiment of the present invention.

Figure 7:
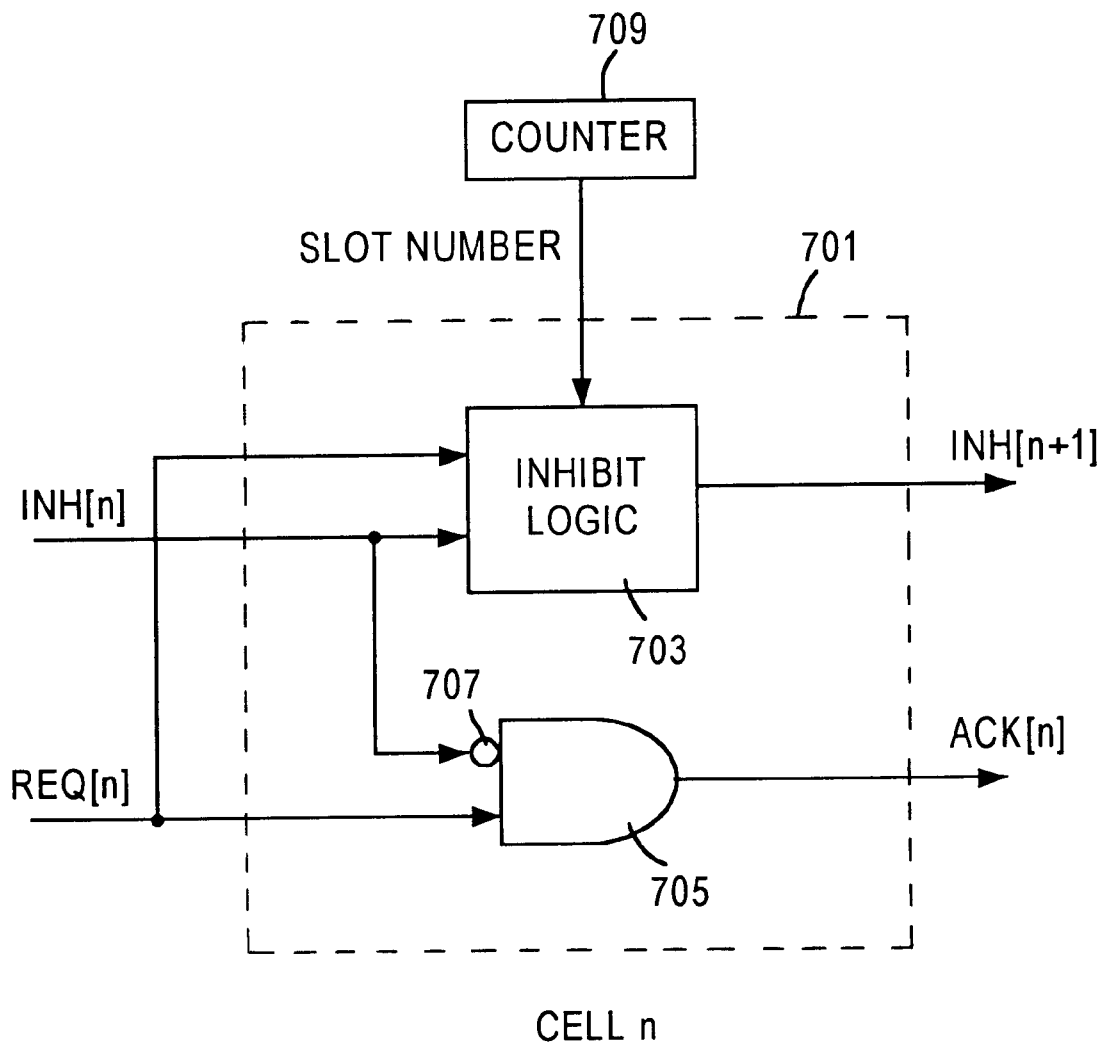
FIG. 7 is a schematic diagram of a cell within the arbitration logic of FIG. 5.

FIG. 7 shows a schematic of a single one of the cells 701 within the arbiters 501, 503. Each of the ports is assigned to one of these cells 701. This figure is an illustration of the following equations:

$$INH[n]=(INH[n-1]|REQ[n-1])\&(SLOT\ NUMBER<>ASSIGNED\ SLOT) \quad (1)$$

$$ACK[n]=\overline{INH[n]}\&REQ[n] \quad (2)$$

These equations reflect that a particular cell issues an acknowledgement signal only if it receives a request and is not inhibited. The setting of the inhibit signal, INH[n], depends on whether the inhibit signal, INH[n−1] (not shown), and the request signal, REQ[n−1] (not shown), of the previous cell are ON as well as whether the current slot number is or is not equal to the assigned slot. Thus, a group of ports 1–6 or 7–12 will only be granted an acknowledgement signal by the arbitration logic 600 if the cell corresponding to the port is not inhibited by a previous cell and has a request. The port that corresponds to the current slot number has the highest priority. If that port does not have a request, successor ports are then given "priority" according to their order in the cascaded sequence. For example, if port 1 is given priority (i.e., slot number equals 1), but does not have a request, then port 2 is deemed to have the highest priority. However, this arrangement does not affect the counter; as described previously, it can be viewed that port 1 has given up its priority to another port without altering the fact that in the next increment of the slot number, port 2 will have an opportunity to be granted an acknowledgement. Similarly, port 2 may give up its priority if it does not have a request. This scheme is detailed below with respect to equations (1) and (2).

Equation (1) indicates that the inhibit signal, INH[n], of cell n is set to 1 when both of the following conditions are true: the request signal, REQ[n−1] or the inhibit signal, INH[n−1], of the previous cell is set; and the slot number (or counter value) of counter 709 is not equal to the assigned slot of that cell. If the slot number is equal to the assigned slot, then INH[n] would not be set to 1 regardless of the value of the previous inhibit signal and request signal. In other words, if the cell currently being examined by the arbitration logic 600 has received a request, the cell will send an acknowledgement signal, and thus, cannot be inhibited. As shown in the figure, a cell 701 includes in inhibit logic 703 as well as a NAND gate 705. The inhibit logic 703 outputs an inhibit signal to a subsequent cell (not shown), denoted as INH[n+1], in response to the slot number and the request signal, REQ[n], and inhibit signal of the current cell, INH[n]. An acknowledgement signal, ACK[n], is output from NAND gate 705 in response to the request signal, REQ[n], and an inverted inhibit signal of the cell n, INH[n]. Inverter 707 inverts the inhibit signal of the INH[n] signal. Each of the six cells of arbiter 501 and arbiter 503 operates in the manner explained. The operation of the cell 701 will be further described below.

Figure 8:
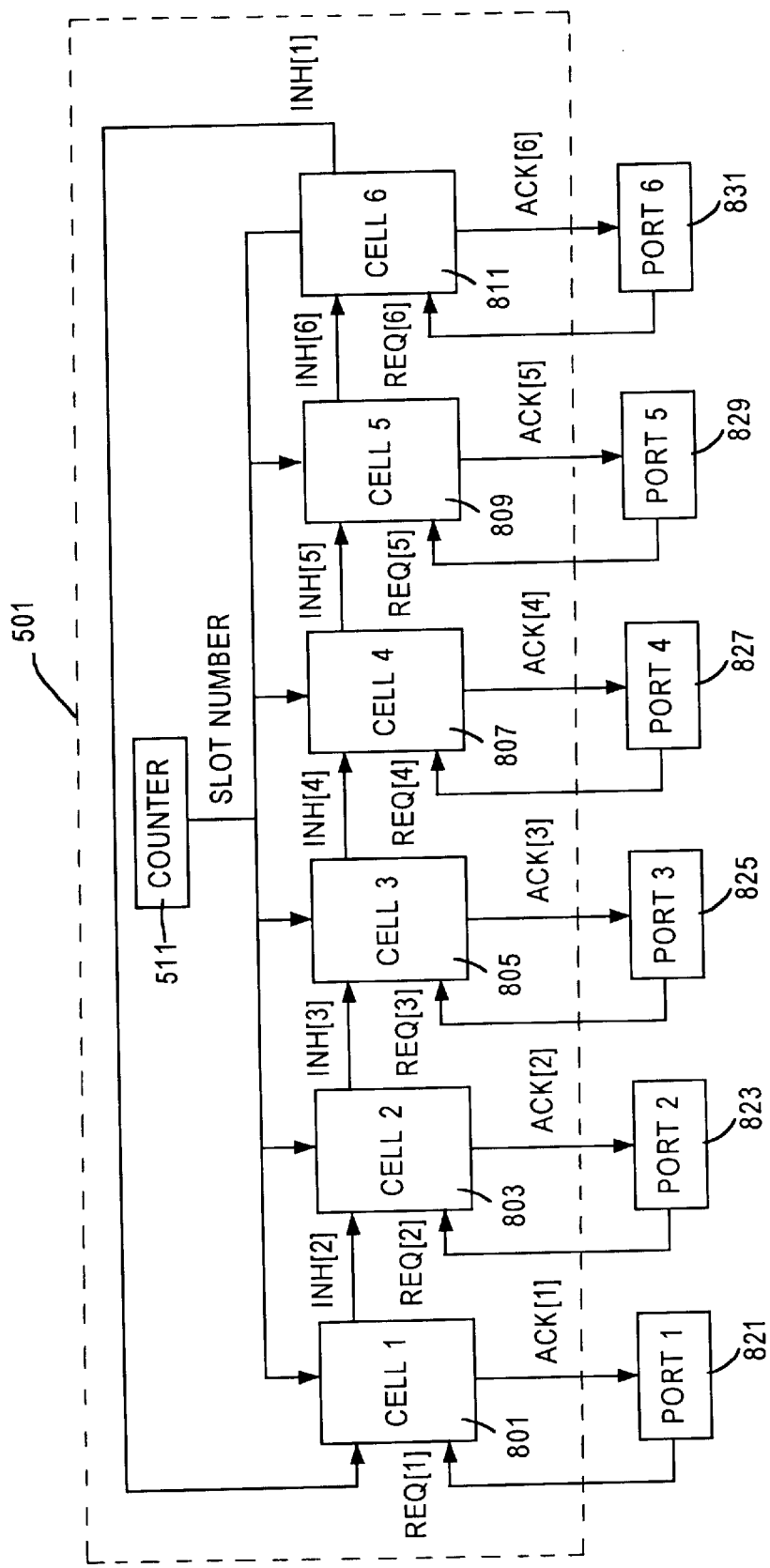
FIG. 8 is a diagram of a round robin arbiter in accord with an embodiment of the present invention.

FIG. 8 shows a representative arbiter architecture utilizing the configuration of cell 701. Cells 1 through 6 (801, 803, 805, 807, 809, and 811) are mapped to ports 1–6 (821, 823, 825, 827, 829, 831), respectively, and are cascaded in a loop. In general, when a cell asserts an acknowledgement signal it also asserts an inhibit signal to a subsequent neighboring cell, preventing that subsequent cell from asserting an acknowledgement signal of its own. This information is subsequently propagated to all the remaining cells as well. The example provided below is illustrative of the operation of an arbiter's architecture (e.g., arbiters 501, 503).

A cell operates according to one of four different scenarios. To better understand these scenarios, the operation of cell 2 is given as an example. In this example, it is assumed that the slot number of 2 is assigned to port 2. The first scenario is the case where the slot number is equal to 2 and either of the inhibit signal or request signal of the previous cell is set. Under this scenario, if the REQ[2] signal is set, cell 2 asserts the ACK[2] signal. In the second scenario, the slot number is equal to 2 and neither the inhibit signal nor request signal of cell 1 (reference numeral 801) is set; in this case, cell 2 also asserts the ACK[2] signal. The third scenario is the case when the slot number is not equal to 2, and either one of the inhibiting signal or request signal of the cell 1 801 is set The setting of the inhibit or the request signal of the previous cell means that the acknowledgement has been granted to another port, the inhibit signal of cell 2, INH[2], accordingly is set. As a result, an ACK[2] signal is not asserted by cell 2 803. In the fourth scenario, the current slot number is not equal to 2 and neither the inhibit signal nor the request signal of cell 1 801 is set. As such, cell 2 803 asserts the ACK[2] signal because an acknowledgement has not yet been asserted by any prior cell within the loop. If the REQ[2] signal is not set, then the cell 2 803 will not asert the ACK[2] signal. Additionally, the inhibit signal, INH[2], would not be set because the slot number is equal to the assigned slot Thus, the INH[2] and REQ[2] signals are output to the next cell 3 (reference numeral 805). By utilizing the architecture of arbiter 800, the complexity of the arbitration logic 600 is greatly reduced when compared with the logic required to implement Tables 1 and 2.

According to the disclosed embodiments, a multilevel arbitration logic 600 arbitrates a number of requests of equal priority in the round robin scheme. The arbitration logic 600 includes multiple cells that are cascaded to output an acknowledgement signal in response to an inhibit signal and a request signal. The arbitration logic 600 also includes a counter that is incremented upon an asserted acknowledgement signal. By utilizing a cell that outputs an inhibit signal based upon the slot number and a request signal, the number of actual logic gates needed to implement the arbitration logic 600 is minimized.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A multiport switch configured for controlling communication of data frames and for storing the data frames in memory, comprising:

a buffer queue for storing free buffer pointers that point to addresses of available memory space within the memory, a plurality of ports for receiving and transmitting the data frames, each of the ports configured to output a request signal to request one of the free buffer pointers from the buffer queue; and arbitration logic for receiving and arbitrating the request signals from the plurality of ports according to a rotating round robin scheme, the arbitration logic comprising a plurality of cells that correspond to the plurality of ports and are cascaded in a prescribed sequence with changeable priorities, wherein one of the cells currently having highest priority and having received one of the request signals sends an acknowledgement signal to the corresponding requesting port, the highest priority cell concurrently sends an inhibit signal to the other cells currently having lower priority to prevent each of the other cells from sending another acknowledgement signal, the priorities of the cells being based in part on relative positions of the cells within the prescribed sequence.

2. The multiport switch of claim 1, wherein the arbitration logic comprises a counter for maintaining the rotating round robin scheme, the counter being incremented in response to the asserted acknowledgement.

3. The multiport switch of claim 2, wherein the highest priority cell asserts the inhibit signal based upon a value of the counter.

4. The multiport switch of claim 1, wherein the multiport switch supports twelve ports, and the arbitration logic comprises:

a first arbiter having a set of six cells corresponding to a first port through a sixth port and a first top level inhibiting signal for globally inhibiting the cells from asserting their respective acknowledgement signals;

a second arbiter having another set of six cells corresponding to a seventh port through a twelfth port and a second top level inhibiting signal for globally inhibiting the cells from asserting their respective acknowledgement signals; and a one-bit arbiter for linking the first arbiter and the second arbiter and for determining whether to assert the first top level inhibiting signal or the second top level inhibiting signal.

5. The multiport switch of claim 1, wherein each of the cells comprises:

an inhibiting logic for outputting the inhibit signal in response to a received request signal and a received inhibit signal; and a NAND gate for outputting the acknowledgement signal in response to an inverted received inhibit signal and the received request signal.

6. The multiport switch of claim 1, further comprising:

a port vector FIFO logic outputting a request signal with a first priority type to the arbitration logic;

an uplink port outputting a request signal with a second priority type to the arbitration logic; and an expansion port outputting a request signal with the second priority type to the arbitration logic, wherein the plurality of queuing logic associated with the plurality of ports outputs request signals of a third priority, the first priority type being of higher priority than the second priority type, the second priority type being of higher priority than the third priority type, the arbitration logic granting acknowledgement based upon the priority types.

7. The multiport switch of claim 1, further comprising:

a chain of buffers for storing the data frames; and a reclaim queue for holding frame pointers of the chain of buffers, wherein the buffer queue stores the frame pointers returned by the reclaim queue.

8. A method of storing the data frames in memory, comprising:

outputting a plurality of request signals to request a free buffer pointer, the free buffer pointer indicating an address of available space within the memory;

synchronizing the plurality of request signals; and arbitrating the request signals in a round robin scheme utilizing a plurality of cells cascaded in a prescribed sequence, wherein the step of arbitrating comprises, selecting a cell based upon a counter value, outputting an inhibit signal from the selected cell in response to a corresponding request signal, the inhibit signal inhibiting the other cells in the prescribed sequence from asserting their respective acknowledgement signals, selectively asserting by the selected cell a corresponding acknowledgement signal based upon the corresponding request signal and a received inhibit signal, incrementing the counter value in response to the asserted acknowledgement signal, and obtaining the free buffer pointer in response to the asserted acknowledgement signal.

9. The method of claim 8, wherein the free buffer pointer associated with the step of outputting a plurality of request signals is stored in a buffer queue.

10. The method of claim 8, wherein the step of arbitrating is performed by an arbitration logic that comprises the plurality of cells.

11. The method of claim 8, wherein the step of outputting a plurality of request signals is performed by a plurality of ports for receiving and transmitting the data frames, each of the ports having a queuing logic for outputting a request signal to request one of the free buffer pointers from the buffer queue.

12. The method of claim 8, wherein the second cell of the step of arbitrating cell asserts the second inhibit signal based upon a value of the counter.

13. The method of claim 11, wherein the arbitration logic of the step of arbitrating comprises:

a first arbiter having a set of six cells corresponding to a first port through a sixth port and a first top level inhibiting signal for globally inhibiting the cells from asserting their respective acknowledgement signals;

a second arbiter having another set of six cells corresponding to a seventh port through a twelfth port and a second top level inhibiting signal for globally inhibiting the cells from asserting their respective acknowledgement signals; and a one-bit arbiter for linking the first arbiter and the second arbiter and for deterring whether to assert the first top level inhibiting signal or the second top level inhibiting signal.

14. The method of claim 11, wherein each of the cells of the step of arbitrating comprises:

an inhibiting logic for outputting the inhibit signal in response to a received request signal and a received inhibit signal; and a NAND gate for outputting the acknowledgement signal in response to an inverted received inhibit signal and the received request signal.

15. The method of claim 11, wherein the plurality of requests in the step of arbitrating have different types of priorities.

* * * * *

UNITED STATES PATENT AND TRADEMARK OFFICE
CERTIFICATE OF CORRECTION

PATENT NO.    : 6,563,818 B1
DATED         : May 13, 2003
INVENTOR(S)   : Jinqlih Sang et al.

Page 1 of 1

It is certified that error appears in the above-identified patent and that said Letters Patent is hereby corrected as shown below:

<u>Column 16,</u>
Line 51, change "deterring" to -- determining --.

Signed and Sealed this

Twenty-third Day of September, 2003

JAMES E. ROGAN
*Director of the United States Patent and Trademark Office*